(12) United States Patent
Anish et al.

(10) Patent No.: US 8,468,882 B2
(45) Date of Patent: Jun. 25, 2013

(54) METHOD AND APPARATUS FOR LOGGING A WELLBORE

(75) Inventors: Kumar Anish, Katy, TX (US); Kear George Richard, Slidell, LA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/955,991

(22) Filed: Nov. 30, 2010

(65) Prior Publication Data

US 2012/0131996 A1 May 31, 2012

(51) Int. Cl.
*E21B 49/00* (2006.01)
(52) U.S. Cl.
USPC ...................................... 73/152.02
(58) Field of Classification Search
None
See application file for complete search history.

(56) References Cited

U.S. PATENT DOCUMENTS

| | | |
|---|---|---|
| 4,614,250 A | 9/1986 | Panetta et al. |
| 4,857,831 A | 8/1989 | Davies et al. |
| 4,862,090 A | 8/1989 | Vannier et al. |
| 4,926,937 A | 5/1990 | Hademenos |
| 4,979,585 A | 12/1990 | Chesnutt |
| 5,022,484 A | 6/1991 | Panetta et al. |
| 5,092,056 A | 3/1992 | Deaton |
| 5,092,423 A | 3/1992 | Petermann |
| 5,947,213 A | 9/1999 | Angle |
| 6,112,809 A | 9/2000 | Angle |
| 6,702,010 B2 | 3/2004 | Yuratich et al. |
| 6,815,954 B2 | 11/2004 | Iwanicki et al. |
| 7,069,775 B2 | 7/2006 | Fredette et al. |
| 7,121,364 B2 | 10/2006 | Mock |
| 7,131,210 B2 | 11/2006 | Fredette et al. |
| 2006/0107736 A1 | 5/2006 | Cens et al. |
| 2011/0048702 A1* | 3/2011 | Jacob ......................... 166/254.2 |

FOREIGN PATENT DOCUMENTS

| | | |
|---|---|---|
| EP | 0911483 | 4/1999 |
| EP | 1281834 | 2/2003 |
| EP | 1577488 | 7/2007 |
| GB | 1405299 | 9/1975 |
| GB | 2459368 | 10/2009 |
| WO | WO 95/21987 | 8/1995 |
| WO | WO 02/37052 | 5/2002 |
| WO | WO 02/070943 | 9/2002 |

OTHER PUBLICATIONS

International Search Report for the equivalent PCT patent application No. PCT/US11/59880 issued on Aug. 31, 2012.

* cited by examiner

*Primary Examiner* — Robert R Raevis
(74) *Attorney, Agent, or Firm* — Stephanie Chi; Darla Fonseca; Jody DeStefanis (57) ABSTRACT

A method and apparatus for logging a wellbore with a translating arm set is provided. The translating arm set has at least one translating sensor pad for measuring at least one downhole parameter. The translating arm set has at least one translating extendable arm extendable from the downhole tool for locating each of the at least one translating sensor pads proximate the wellbore wall. The translating arm set has an actuator for translating the at least one translating arm set along a longitudinal axis of the downhole tool whereby the translating sensor pad is positionable at a selected longitudinal position relative to the downhole tool.

4 Claims, 11 Drawing Sheets

METHOD AND APPARATUS FOR LOGGING A WELLBORE

TECHNICAL FIELD

The present invention relates to techniques for performing wellbore operations. More particularly, the present invention relates to downhole tools, such as logging while drilling (LWD), wireline logging, production, coiled-tubing and/or other tools for performing logging and/or other wellbore operations.

BACKGROUND

Wellbores are drilled to locate and produce hydrocarbons. A downhole drilling tool with a bit at an end thereof is advanced into the ground to form a wellbore. As the drilling tool is advanced, a drilling mud is pumped through the drilling tool and out the drill bit to cool the drilling tool and carry away cuttings. The fluid exits the drill bit and flows back up to the surface for recirculation through the tool. The drilling mud may also be used to form a mud cake to line the wellbore. The drilling mud may be air, water or oil based drilling mud.

During the drilling operation, it may be desirable to perform various downhole evaluations, such as testing and/or sampling, (referred to herein as "logging"). In some cases, the drilling tool may be provided with devices to log the surrounding formation. In some cases, the drilling tool may be removed and a wireline logging tool may be deployed into the wellbore to log the formation. Logging may also be performed during other wellbore operations, such as treatment, production, etc.

The logging may be performed by sensor pads on the logging tool that collect data regarding the formations. Typically, the more surface area of the wellbore wall the sensor pads cover, the more complete the formation data collected by the sensor pads. When the drilling mud is an oil based drilling mud, the sensor pads typically send and collect high frequency current into the formation in order to determine properties of the formation. When the drilling mud is a water based drilling mud, sensor pads located proximate the wellbore may send low frequency current into the formations for collection at another location on the downhole tool.

Attempts have been made to provide downhole tools with devices such as sensor pads that retract during transport through the wellbore and then extend for contact with the wellbore wall. Some techniques may involve downhole tools with extendable arms as described, for example, in U.S. Pat. Nos. 4,614,250, 4,926,937, 4,979,585, 5,092,056, 6,702,010, 5,022,484, 7,069,775, 7,131,210. Various downhole tools with sensors positioned on extendable arms have been developed, such as the NCMI™, SHDT™, FMS™, FMI™, OBMI™, OBDT™ and HDT™ tools commercially available from SCHLUMBERGER™; the OMRI™ and EMI™ tools commercially available from HALLIBURTON™; the STAR™ and EARTHIMAGER™ commercially available from BAKER HUGHES™ INC.; and the CMI MICROIMAGER™ commercially available from WEATHERFORD™ INTL.

Despite the development of techniques involving downhole tools with extendable arms, there remains a need to provide advanced techniques for effectively positioning sensor pads against the wellbore wall. It may be desirable to provide techniques that enable logging as the downhole tool passes through the wellbore. It may be further desirable to provide techniques to enhance a contact area between multiple sensor pads and the wellbore wall. Preferably, such techniques involve one or more of the following, among others: increased contact of the sensors with the wellbore wall, increased coverage of the wellbore wall, verification of the previously logged areas, enhanced (e.g., uniform) engagement with the wellbore wall, and/or bi-directional logging of the wellbore.

BRIEF DESCRIPTION OF THE DRAWINGS

Implementations of the invention may be better understood when consideration is given to the following detailed description thereof. Such description makes reference to the annexed pictorial illustrations, schematics, graphs, drawings, and appendices. In the drawings.

SUMMARY OF THE DISCLOSURE

According to an aspect of the present disclosure, one or more embodiments relate to a translating arm set for logging a wellbore. The wellbore has a wellbore wall and at least one subterranean formation thereabout. The translating arm set may be positionable on a downhole tool deployable into the wellbore. The translating arm set has at least one translating sensor pad for measuring at least one downhole parameter. The translating arm set has at least one translating extendable arm extendable from the downhole tool for locating each of the at least one translating sensor pads proximate the wellbore wall. The translating arm set has an actuator for translating the at least one translating arm set along a longitudinal axis of the downhole tool whereby the translating sensor pad is positionable at a selected longitudinal position relative to the downhole tool.

According to another aspect of the present disclosure, one or more embodiments relate to a system for logging a wellbore. The wellbore has a wellbore wall and at least one subterranean formation thereabout. The system has a downhole tool deployable into the wellbore. The system has a plurality of arm sets, wherein one or the arm sets is configured to translate along a longitudinal axis of the downhole tool. Each of the plurality of arm sets has at least one sensor pad for measuring at least one downhole parameter, at least one extendable arm extendable from the downhole tool for locating each of the at least one sensor pads proximate the wellbore wall, and an actuator. The actuator is for translating the at least one of the arm sets along the longitudinal axis of the downhole tool whereby the sensor pads of each of the plurality of arm sets is positionable at a selected longitudinal position relative to the downhole tool.

According to another aspect of the present disclosure, one or more embodiments relate to a method for logging a wellbore. The wellbore has a wellbore wall and at least one subterranean formation thereabout. The method comprises deploying a downhole tool into the wellbore. The downhole tool has a translating arm set thereon. The translating arm set has at least one translating sensor pad for measuring at least one downhole parameter, at least one translating extendable arm extendable from the downhole tool for locating each of the at least one translating sensor pads proximate the wellbore wall, and an actuator. The actuator is for translating the at least one translating arm set along a longitudinal axis of the downhole tool whereby the translating sensor pad is positionable at a selected longitudinal position relative to the downhole tool. The method comprises translating the translating arm set to the selected longitudinal position wherein the translating sensor pads are in a coplanar position with at least one sensor pad of a second arm set. The method comprises logging the wellbore with the at least one sensor pads and the at least one translating sensor pads.

DETAILED DESCRIPTION OF AN EMBODIMENT OF THE INVENTION

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

Figure 1:
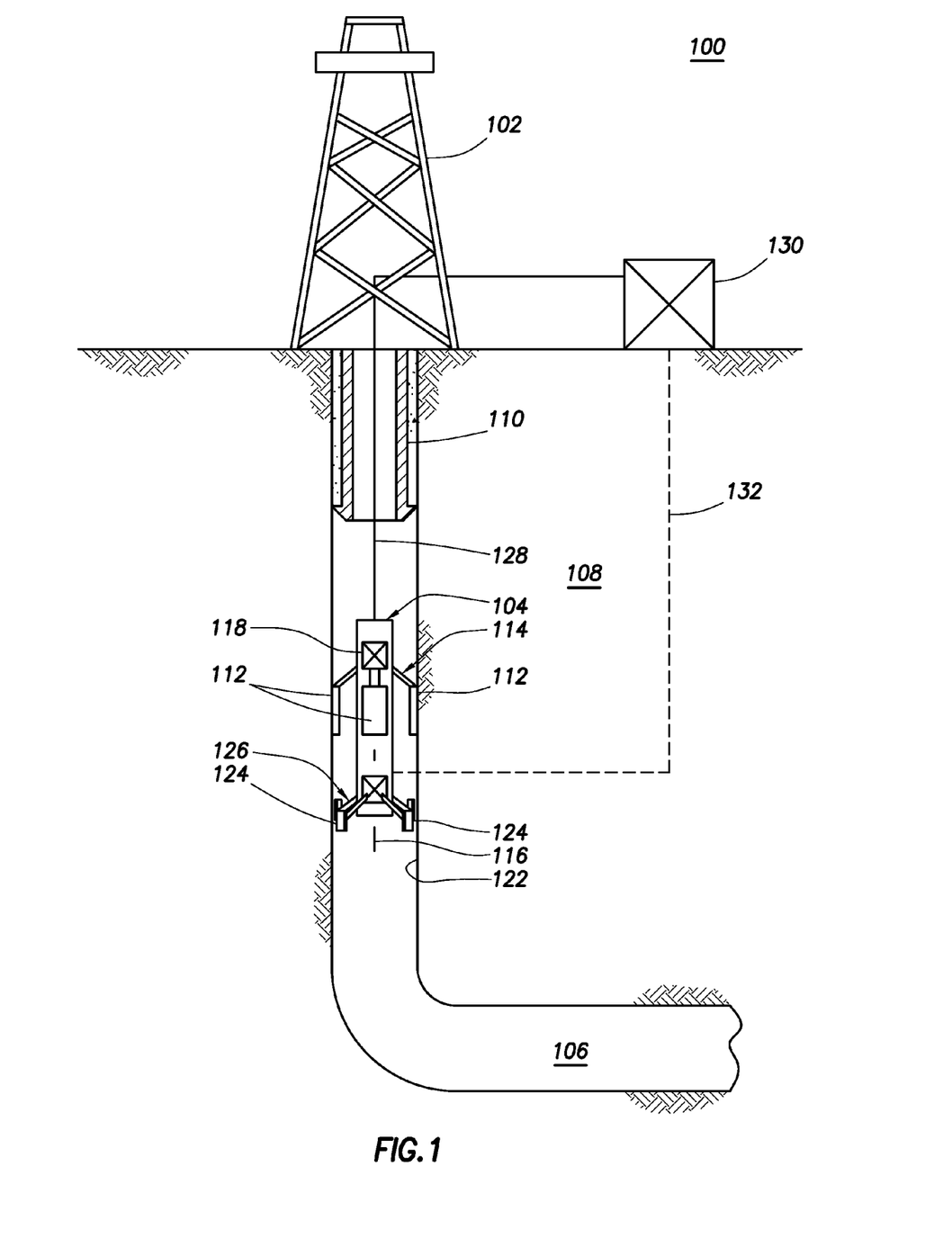
FIG. 1 depicts a schematic view of a system for logging a wellbore having an arm system on a downhole tool for locating a sensor pad proximate a wellbore wall.

FIG. 1 depicts a schematic view of a wellsite 100 having an oil rig 102 with a downhole tool 104 suspended into a wellbore 106 therebelow. The wellbore 106 has been drilled by a drilling tool (not shown) through one or more formations 108. A drilling mud, and/or a wellbore fluid, may have been pumped into the wellbore 106 and may line a wall thereof. The drilling mud used may be an oil based drilling mud. As shown, a casing 110 has also been positioned in a portion of the wellbore 106 and cemented into place therein. The wellbore 106, as shown, is a land based wellbore 106; however, it may be a water, or sea, based wellbore 106.

The downhole tool 104 may include one or more translating sensor pads 112, or pads, for determining one or more downhole parameters, such as formation parameters and/or wellbore fluid parameters (e.g., temperature, pressure, resistivity, acoustic, nuclear, electromagnetic, micro-resistivity, viscosity, resistivity, composition, etc.) The downhole tool 104 may have one or more translating arm set(s) 114 configured to locate the at least one or more translating sensor pads 112 at a desired longitudinal position along a longitudinal axis 116 of the downhole tool 104. One or more actuators 118 may translate, or move, the translating arm set(s) 114 to the desired longitudinal position. A bias and/or an arm extension actuator (not shown) may extend the translating sensor pad(s) 112 radially away from the longitudinal axis 116 to a location proximate a wellbore wall 122.

The translating arm set 114 of the downhole tool 104 may permit the translating sensor pad(s) 112 to be moved to the desired longitudinal position relative to the downhole tool 104 while the downhole tool 104 is located within the wellbore 106. For example, the desired longitudinal position may be a position relative to the downhole tool 104 substantially longitudinally aligned with at least one sensor pad 124 coupled to an arm set 126. Therefore, the translating arm set 114 of the downhole tool 104 may move the translating sensor pad 112 proximate the sensor pad 124 on the arm set 126. The arm set 126 may be a non-translating, or fixed, arm set. Thus, the arm set 126 may be fixed at a longitudinal position along the longitudinal axis 116 of the downhole tool 104. The arm set 126 may move each of the at least one sensor pads 124 from a location proximate the downhole tool 104 to a logging position proximate the wellbore wall 122. The desired longitudinal position may be a location on the downhole tool 104 wherein the translating sensor pads 112 are in a coplanar alignment with the sensor pads 124 when in the logging position. The logging position may be a position wherein the translating sensor pads 112 and the sensor pads 124 are proximate the wellbore 106 wall for logging the formation 108.

The downhole tool 104 is shown as a wireline logging tool lowered into the wellbore 106 to take various measurements. Although the downhole tool 104 is shown as being conveyed into the wellbore 106 on a wireline 128, it should be appreciated that any suitable conveyance may be used, such as a slick line, coiled tubing, a drill string, a casing string and the like. The downhole tool 104 may be operatively connected to a surface unit 130 for communication therebetween. The downhole tool 104 may be wired via the wireline 128, as shown, and/or wirelessly linked via the one or more telemetry devices (not shown). The one or more telemetry devices may include any telemetry devices, such as electromagnetic devices, for passing signals to the surface unit 130 as indicated by a communication link 132. Further, it should be appreciated that any communication device or system may be used to communicate between the downhole tool 104 and the surface unit 130. Signals may be passed between the downhole tool 104 and the surface unit 130 and/or other locations for communication therebetween.

Figure 2A:
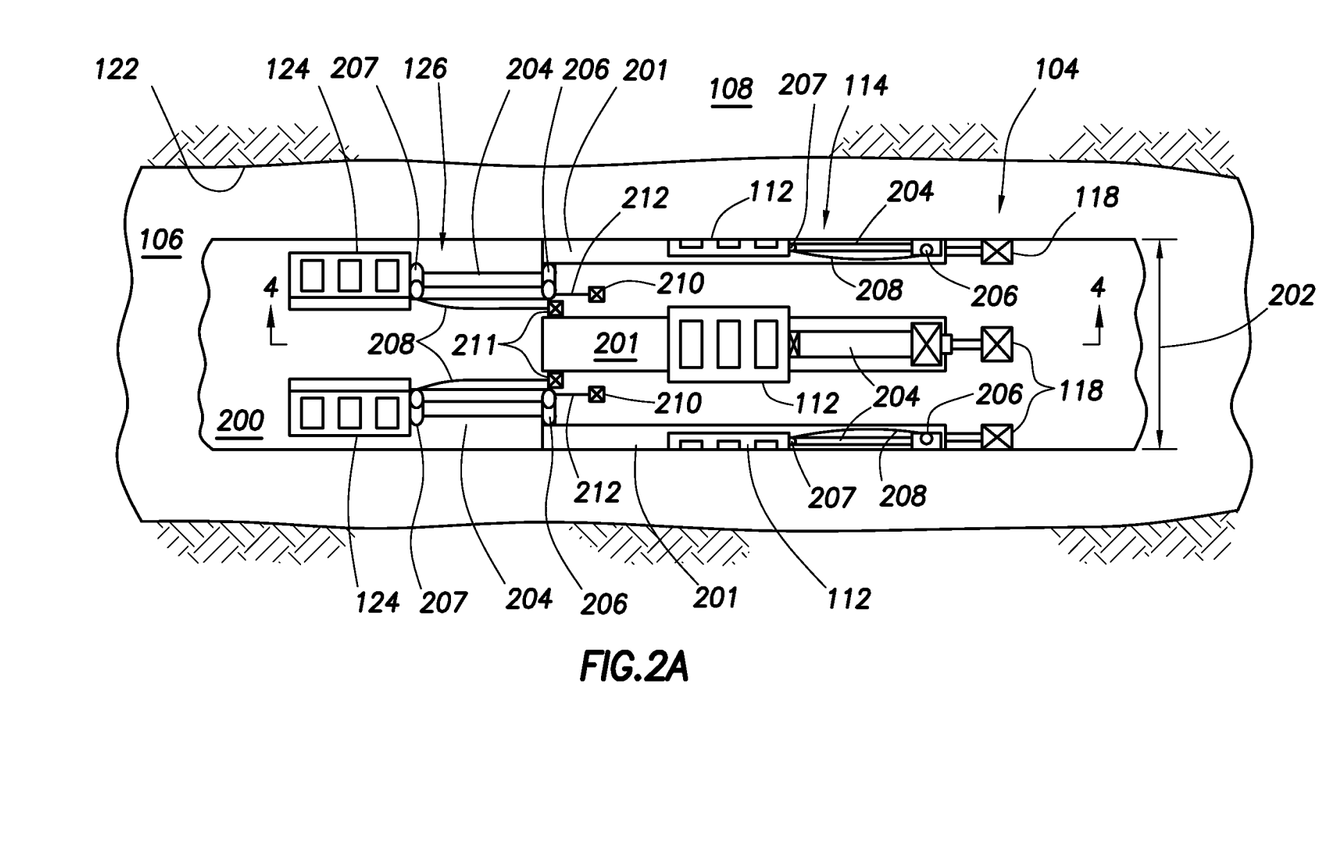
FIGS. 2A-2D depict schematic views of the operation of a portion of the downhole tool of FIG. 1.

FIGS. 2A-D show schematic views of a portion of the downhole tool 104 of FIG. 1 in various operational positions such as a retracted position and the logging position. FIG. 2A depicts a portion of the downhole tool 104 in the retracted position. In the retracted position, the translating sensor pads 112 and/or the sensor pads 124, or pads 112 and/or 124, are located proximate a tool body 200. The translating arm set 114 and the arm set 126 may maintain the translating sensor pads 112 and/or sensor pads 124 in the retracted position until the downhole tool 104 is at a location in the wellbore 106 where logging will begin. The retracted position may allow the downhole tool 104 to travel into and/or out of the wellbore 106 rapidly without damaging the translating sensor pads 112, the sensor pads 124, the translating arm set 114, the arm set 126 and/or wellbore wall 122.

An outer diameter 202 of the tool body 200 may be sized to easily pass through the wellbore 106. The translating sensor pads 112 and/or sensor pads 124 may be sized in order to maximize the logging area or contact area of the translating sensor pads 112 and/or sensor pads 124 against the wellbore wall 122. Because the size of the translating sensor pads 112 and/or sensor pads 124 is maximized for contact with the wellbore wall 122, the translating sensor pads 112 and the sensor pads 124 may be too large to fully retract when they are located at substantially the same longitudinal position on the downhole tool 104. Therefore, the translating arm set 114 may be configured to maintain the translating sensor pads at a different longitudinal position when retracted and to move the translating sensor pads 112 to a coplanar position with the sensor pads 124 when the sensor pads 124 are in the logging position.

The coplanar position may be a position wherein the translating sensor pads 112 and the sensor pads 124 are located at substantially the same longitudinal position of the downhole tool 104 when the downhole tool is in the logging position.

The same longitudinal position may be a longitudinal position on the downhole tool 104 within the measurement resolution tolerance for the downhole tool 104. For example, for an Oil Base Micro Imaging (OBMI) tool, measurement resolution tolerance may be ⁴⁄₁₀" (1.016 cm). Therefore, for the OBMI tool, the coplanar position may be a position wherein the translating sensor pads 112 and the sensor pads 124 are located at a longitudinal depth on the downhole tool 104 and wherein each of the translating sensor pads 112 and/or sensor pads 124 are located less than ⁴⁄₁₀" (1.016 cm) from one another longitudinally along the downhole tool 104. Further, the same-longitudinal position may be larger than the measurement resolution tolerance of the downhole tool 104.

Having the sensor pads 124 and the translating sensor pads 112 located at the coplanar position may allow the downhole tool 104 to log a large area of the wellbore wall 122 at substantially the same longitudinal position in the wellbore 106. Actuator(s) 118 may move the translating arm set 114 along a guide 201 in order to move the translating sensor pads 112 to the same longitudinal position as the sensor pads 124, as will be described in more detail below. In the retracted position, the translating arm set 114 has not been translated along the guide 201 by the actuator 118, and the translating sensor pads 112 and/or sensor pads 124 are proximate the tool body 200 at separate longitudinal positions along the downhole tool 104. When the downhole tool 104 is at a location in the wellbore 106 where logging will be performed, the operator, and/or controller, may initiate the downhole tool 104 to move the translating sensor pads 112 and/or sensor pads 124 to the logging position, thereby moving the translating sensor pads 112 and/or sensor pads 124 to the coplanar position.

Figure 2B:
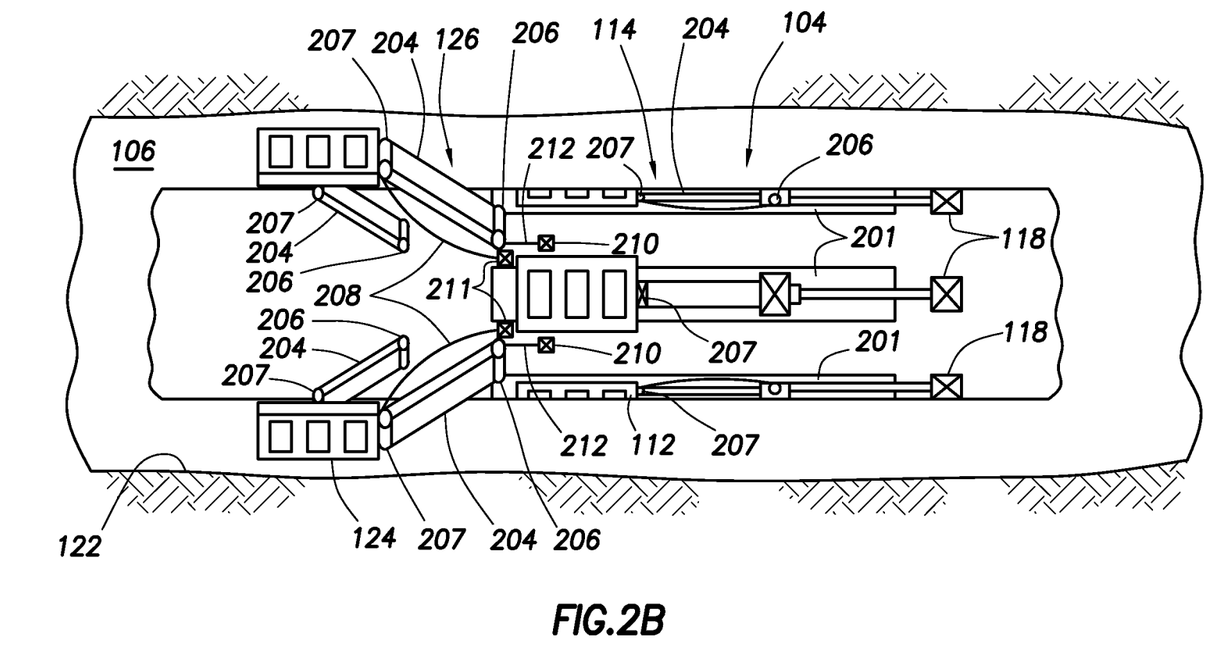

FIG. 2B depicts the downhole tool 104 of FIG. 1, with the translating sensor pads 112 and/or the sensor pads 124 in an intermediate position between the retracted position and the logging position. In the intermediate position, the arm set 126 may have been moved to, or extended to, the logging position proximate the wellbore wall 122 using a biasing member 208 and/or an arm actuator 210, as will be described in more detail below. With the sensor pads 124 on the arm set 126 in the logging position there is sufficient space around the tool body 200 to move the translating sensor pads 112 of the translating arm set 114 to the longitudinal position of the arm set 126. Thus, the actuator 118 may begin to translate the translating arm set 114. The translating arm set 114 may travel along the guide 201 until the translating arm set 114 reaches the desired longitudinal position. As shown in FIGS. 2A-2D, the translating arm set 114 has the actuator 118 located up tool on the downhole tool 104. The actuator 118 may move the translating arm set 114 to the logging position. Although the actuator 118 is shown up tool of the translating arm set 114, it may be located down tool from the translating arm set 114. Further, the actuator 118 may be configured to move the translating arm set 114 up tool from the retracted position to the logging position rather than downhole.

Figure 2C:
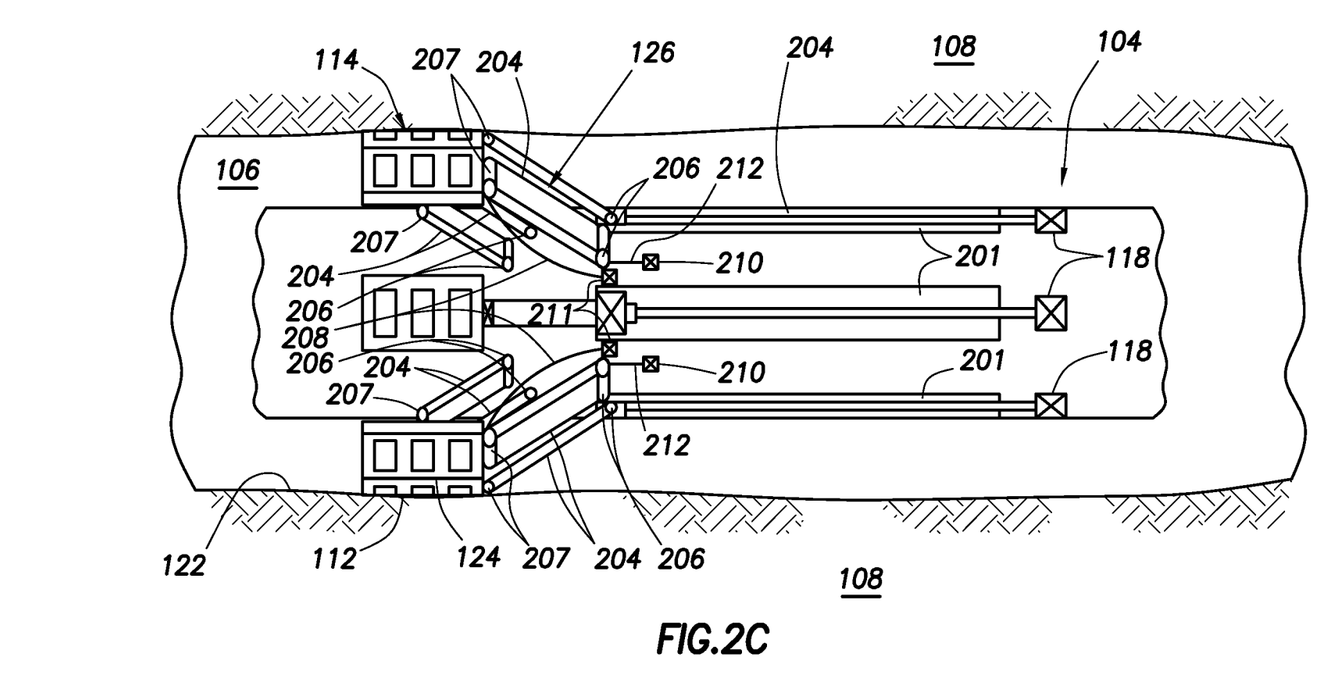

FIG. 2C depicts the downhole tool of FIG. 1, with the translating sensor pads 112 and the sensor pads 124 in the logging position. In the logging position, the translating arm set 114 may have reached the desired longitudinal position. The desired longitudinal position as shown is substantially the same longitudinal position as the arm set 126, thereby allowing the sensor pads 124 and the translating sensor pads 112 to be at the same longitudinal position during logging. With the translating arm set 114 at the desired longitudinal position, the translating sensor pad(s) 112 may be extended to the logging position. The sensor pads 124 and the translating sensor pads 112 may now be located proximate the wellbore wall 122 in order to log a substantial portion of the circumference of the wellbore 106 while maintaining accuracy of depth between the pads 112 and/or 124. To log the wellbore wall 122, current may be sent from each of the sensor pad 124 and the translating sensor pad 112 into the formation 108 and collected on the sensor pads 124 and/or translating sensor pads 112. From the current, the required wellbore parameters may be acquired, as will be described in more detail below.

When the translating sensor pads 112 and the sensor pads 124 are in the logging position and current is being passed through the formation and collected, the downhole tool 104 may be moved within the wellbore 106 to log the formation 108. As shown in FIG. 2C, the downhole tool 104 may be moved up hole during logging. Further, the downhole tool 104 may be configured to move downhole during logging, and/or move either up hole or downhole during logging.

As shown in FIG. 2C, the arm set 126 and the translating arm set 114 may have four sensor pads 124 and/or translating sensor pads 112 respectively. Thus, eight sensor pads 124 and 112 may be located at substantially the same longitudinal position and/or coplanar position relative to the downhole tool 104 during logging. The eight sensor pads 124 and 112 may allow for an increased surface area of the wellbore wall 122 to be logged at substantially the same longitudinal position with the downhole tool 104. For example, the eight sensor pads 124 and 112 may allow for about a 40%-80% area or up to about a 64% surface area of an 8" (20.32 cm) wellbore to be logged. Although the translating arm set 114 and the arm set 126 are shown as each having four translating sensor pads 112 and four sensor pads 124, there may be any suitable number of translating sensor pads 112 and/or sensor pads 124, such as three translating sensor pads 112 and three sensor pads 124, two translating sensor pads 112 and two sensor pads 124, five translating sensor pads 112 and five sensor pads 124, six translating sensor pads 112 and six sensor pads 124, two translating sensor pads 112 and four sensor pads 124, and the like.

Figure 2D:
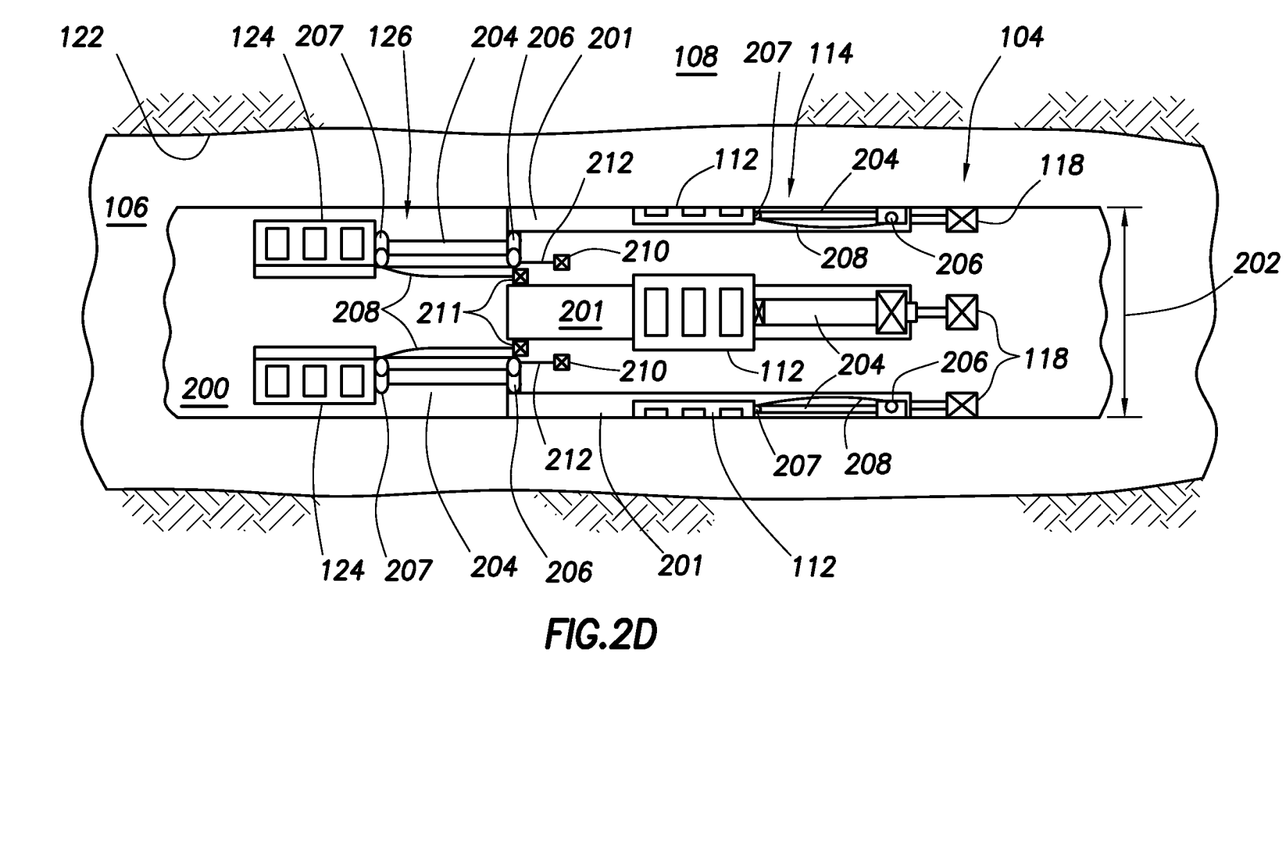

FIG. 2D depicts the downhole tool 104 of FIG. 1 in the retracted position. When the logging operation is complete, the translating sensor pads 112 may be moved proximate the tool body 200 and the translating arm set 114 may be moved by the actuator(s) 118 to the retracted position. With the translating sensor pads 112 clear of the sensor pads 124, the sensor pads 124 may be moved to the retracted position proximate the tool body 200. With the arm set 126 and the translating arm set 114 in the retracted position, the downhole tool 104 may be moved to a different location within the wellbore 106 and/or removed from the wellbore 106.

The translating arm set 114 and the arm set 126, as shown in FIGS. 2A-2D, may each have one or more extendable arms 204 for locating the translating sensor pad 112 and/or the sensor pads 124 proximate the wellbore wall 122. The one or more extendable arms 204, as shown, may couple to the tool body 200 at a pivot connection 206 and rotate about the pivot connection 206 when extending to the logging position. Further, the one or more extendable arms 204 may couple to the translating sensor pads 112 and/or the sensor pads 124 at a pad pivot connection 207. Although the extendable arms 204 are shown as being one arm with the pivot connection 206 and the pad pivot connection 207, the extendable arms 204 may have any suitable arms and/or arm systems for moving the translating sensor pad 112 and/or the sensor pad 124 between a position proximate the tool body 200 and the wellbore wall 122. For example, the extendable arms 204 may have two substantially parallel arms pivotally coupled to the tool body 200, two arms wherein each arm is configured to pivotally couple to the tool body 200 and an end of the sensor pad 112 and/or translating sensor pads 124, and the like.

Figure 4:
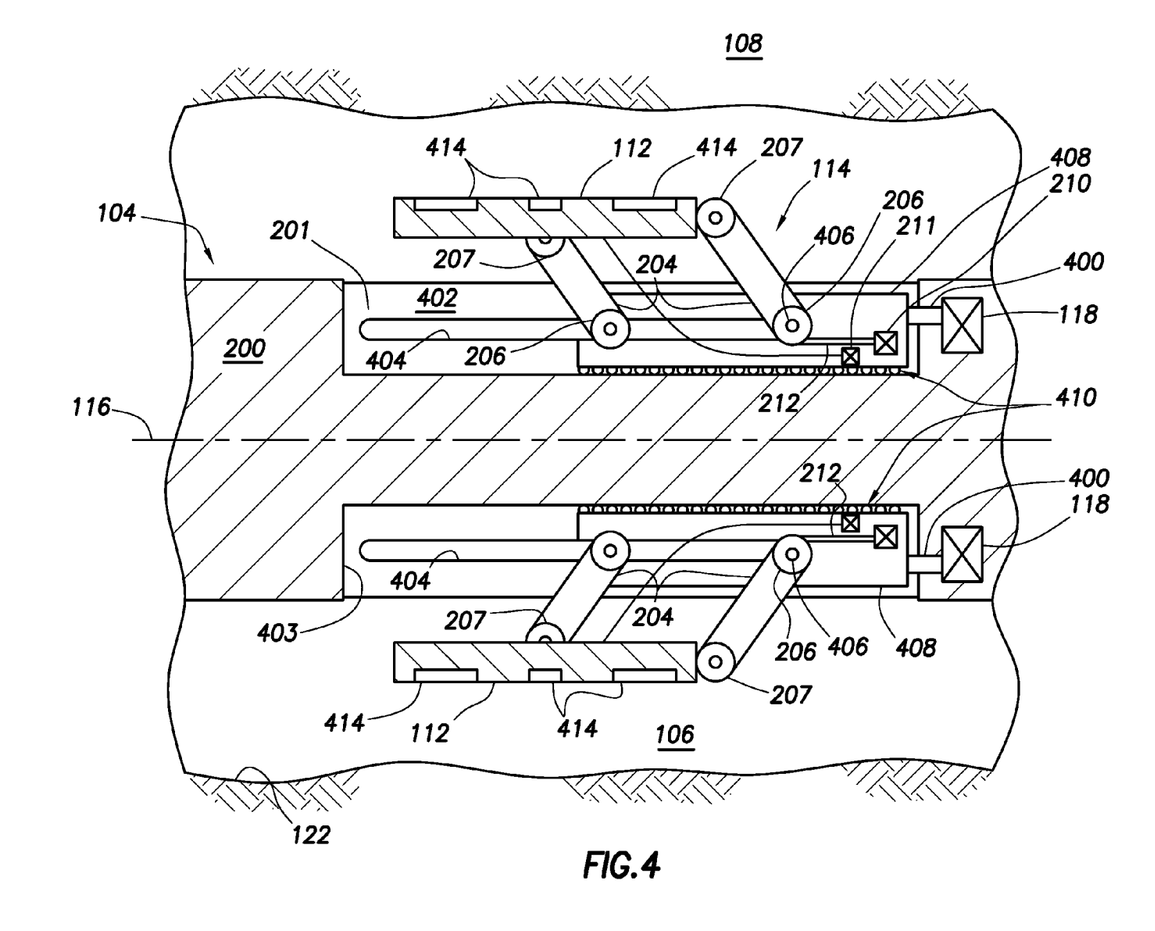
FIG. 4 depicts a cross-sectional view of a portion of the downhole tool of FIG. 2A.

Each of the extendable arms 204 may be motivated by a biasing member 208 and/or an arm actuator 210, as shown in FIGS. 2A-2D. The biasing member 208 may bias the extendable arms 204 toward the logging position. As shown, the biasing member 208 is a leaf spring, although it may be any suitable biasing member such as a coiled spring, a resilient member and the like. The biasing member 208 may couple to the extendable arms 204 on a first end and may connect to a fixed connection 211 on the tool body 200, for the arm set 126. For the translating arm set 114, the fixed connection 211 may be movable with the pivot connection 206 (as shown in FIG. 4). Further, the first end of the biasing member 208 may couple to the translating sensor pad 112, or the sensor pads 124. Each of the extendable arms 204 may have the biasing members 208 and thereby each of the extendable arms 204 may independently react as the translating sensor pads 112 and/or the sensor pads 124 engage the wellbore wall 122. Further, the extendable arms 204 may be cross-linked to move together between the extended and retracted position.

The arm actuator 210 (shown schematically) may be configured to overcome the biasing force of the biasing member 208 in order to move the extendable arms 204 toward the closed position. Each of the extendable arms 204 may each couple to separate arm actuators 210. Further, there may be one arm actuator 210 for actuating all of the extendable arms 204 in the translating arm set 114 and/or the arm set 126. The arm actuator 210 may be a hydraulic piston and cylinder. A portion of a rod 212 (shown schematically) coupled to the piston may engage the extendable arm 204. As the piston moves the rod 212, the rod 212 may overcome the biasing force in order to move the extendable arms 204 to the closed position. Although the arm actuator 210 is described as being a hydraulic piston and cylinder it may be any suitable device for controlling the movement of the extendable arms 204, such as a pneumatic actuator, a servo, a mechanical actuator and the like.

The translating arm set 114 and/or the arm set 126 may be configured to operate without the arm actuator 210. For example, the biasing members 208 may bias the extendable arms 204 toward the logging position while the downhole tool 104 is located within the wellbore 106. Although the biasing member 208 is described as motivating the extendable arms 204 toward the logging position and the arm actuator 210 as moving the extendable arms 204 toward the retracted, or closed position, the biasing members 208 may bias the extendable arms 204 toward the closed position while the arm actuator 210 moves the extendable arms 204 toward the logging position.

Figure 3:
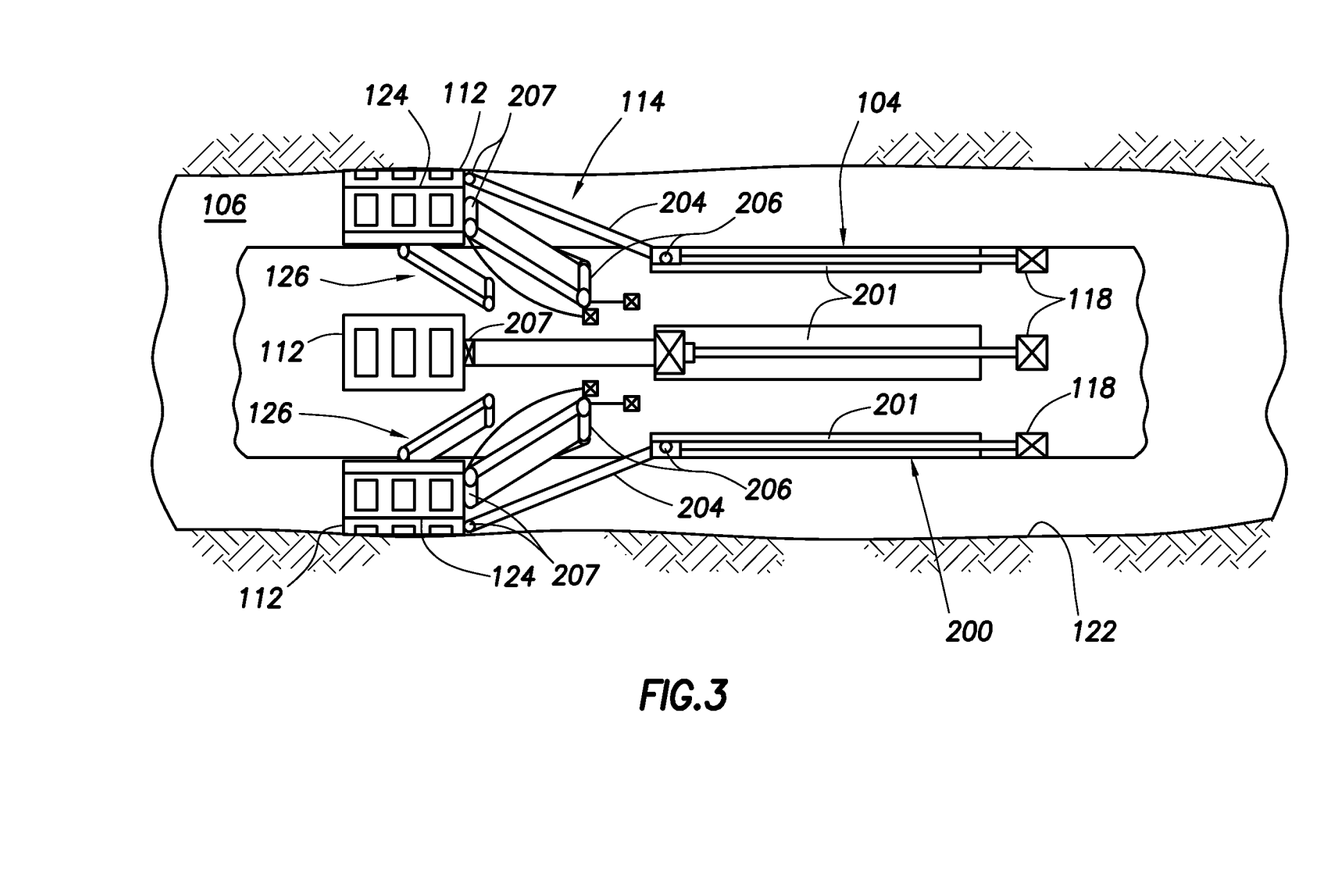
FIG. 3 depicts a schematic view of an alternate configuration of the portion of the downhole tool of FIG. 2C.

The extendable arms 204 for the translating arm set 114 and the arm set 126 may be substantially similar to one another. Further, the extendable arms 204 for the translating arm set 114 may be a different size and/or type of extendable arm from the size and/or type of extendable arms 204 used for the arm set 126. For example, the extendable arms 204 for the translating arms set 114 may be longer than the extendable arms 204 for the arm set 126, as shown in FIG. 3. In this configuration, the translating arm set 114 may locate the pivot connection 206 at a location longitudinally displaced from the pivot connection 206 of the arm set 126 while still locating the translating sensor pads 112 at the same longitudinal position relative to the downhole tool 104 as the sensor pads 124 when in the logging position. Further, the translating arm set 114 may have any of the extendable arms described herein while the arm set 126 may have a different set of extendable arms.

FIG. 4 depicts a cross sectional view of a portion of the downhole tool 104 of FIG. 2A. The actuator 118, as shown, translates the translating arm set 114 along the guide 201 between the retracted position, as shown, and the logging position. The actuator(s) 118 may be a hydraulic actuator having a piston and cylinder coupled to a translating rod 400. The translating rod 400 may couple to the translating arm set 114 in order to move the translating arm set 114 between the retracted and logging positions while the downhole tool 104 is within the wellbore 106. The actuator 118 may be separate actuators configured to independently move each of the translating sensor pads 112 coupled to the extendable arms 204 separately. In another configuration, there may be one actuator 118 configured to move the translating arm set 126 as a unit, thereby moving all of the translating sensor pads 112 together. The actuator 118 may be any suitable actuator, such as a servo, a mechanical actuator, and the like.

The guide 201, as shown, may be a slot 402 formed in the tool body 200 of the downhole tool 104. The slot 402 may be formed parallel to the longitudinal axis 116 of the downhole tool 104. The slot 402, or a portion thereof, may guide translating arm set 114 as the translating rod 400 of the actuator 118 moves the translating arm set 114 between the retracted and logging positions. Although the guide 201 is shown as a slot 402 for guiding the translating arm set 114, the guide 201 may be any suitable device for guiding the translating arm set 114, such as a track, retaining pins, geometry of the arm and slot, and the like.

The slot 402 may have a longitudinal guide slot 404 for maintaining the translating arm set 114 in the slot 402 during operation. The longitudinal guide slot 404 may be configured to receive a translating pin 406 of the translating arm set 114. The translating pin 406 may be configured to travel within the longitudinal guide slot 404 while the translating arm set 114 travels between the retracted and the logging positions. The slot 402 may further have one or more stops 403 configured to limit the travel of the translating arm set 114 as needed depending on the borehole diameter. The travel limit of the translating arm set 114 may align the translating sensor pads 112 at the desired longitudinal position, for example, aligned with the sensor pads 124 (as shown in FIG. 2C). Further, the limit of the actuator 118 may align the translating arm set 114 with the sensor pads 124.

The translating arm set 114 may have translating sled 408 for moving the translating arm set 114 as a unit. The translating sled 408 may be configured to house the pivot connection 206, the arm actuator 210, the fixed connection 211 of the biasing member 208, and/or the translating pin 406. The translating rod 400 may engage the translating sled 408 and move it between the retracted and logging positions. The translating sled 408 may move along the guide 201 as the actuator 118 motivates the translating sled 408. The translating sled 408 is shown as a housing, but may have any suitable form and/or shape for moving the translating arm set 114 as a unit. The translating sled 408 may have one or more friction reducers 410 for reducing the friction between the translating sled 408 and the guide 201. As shown, the friction reducers are rollers, although the friction reducer 410 may be any suitable device for minimizing friction between the translating sled 408 and the guide 201 such as a slide plate, roller bearings, grease and the like.

The sensor pads 124 and the translating sensor pads 112, as shown in FIGS. 2A-2D, may be any suitable sensor pad for detecting parameters in the formations 108. The sensor pads 124 and the translating sensor pads 112 may be similar, or substantially identical, to one another. Further, the sensor pads 124 and the translating sensor pads 112 may vary between the arm set 126 and the translating arm set 114 and/or between the extendable arms 204 on the arm sets 126 and/or 114.

Although not shown in detail, the translating sensor pads 112 and/or the sensor pads 124 may include a plurality of electrodes 414 for measuring the downhole parameters. Such electrodes 414 may include at least one button electrode and at least one source or return electrode and at least one guard electrode to enable micro-electrical imaging of an area near the wellbore 106.

The translating sensor pads 112 and/or the sensor pads 124 may communicate with the surface unit 130 and/or the wireline 128 via the one or more communication links 132 (as shown in FIG. 1). The communication links 132 between the sensor pads 112 and/or 124 and the wireline 128 may be hardwired to the downhole tool 104. Further, the communication links 132 from the translating sensor pads 112 and/or sensor pads 124 may be wireless connections to the wireline 128, the surface unit 130 and/or the downhole tool 104. It should be appreciated that the downhole tool 104 may comprise an internal memory for recording the measured downhole parameters.

The translating sensor pads 112 and/or sensor pads 124 as described herein are preferably positionable against the wellbore wall 122 for taking measurements thereof. The translating sensor pads 112 and/or sensor pads 124 may be conventional sensors or sensing systems operable for downhole use for example the OBMI tool, the Fullbore Formation Micro-Imager (FMI) and the like. Electrodes or other sensors may be used in the translating sensor pads 112 and/or sensor pads 124 for taking desired downhole measurements. Sensors may also be positioned at other locations about the wellbore 106 and/or tool to take additional downhole measurements.

Figure 5A:
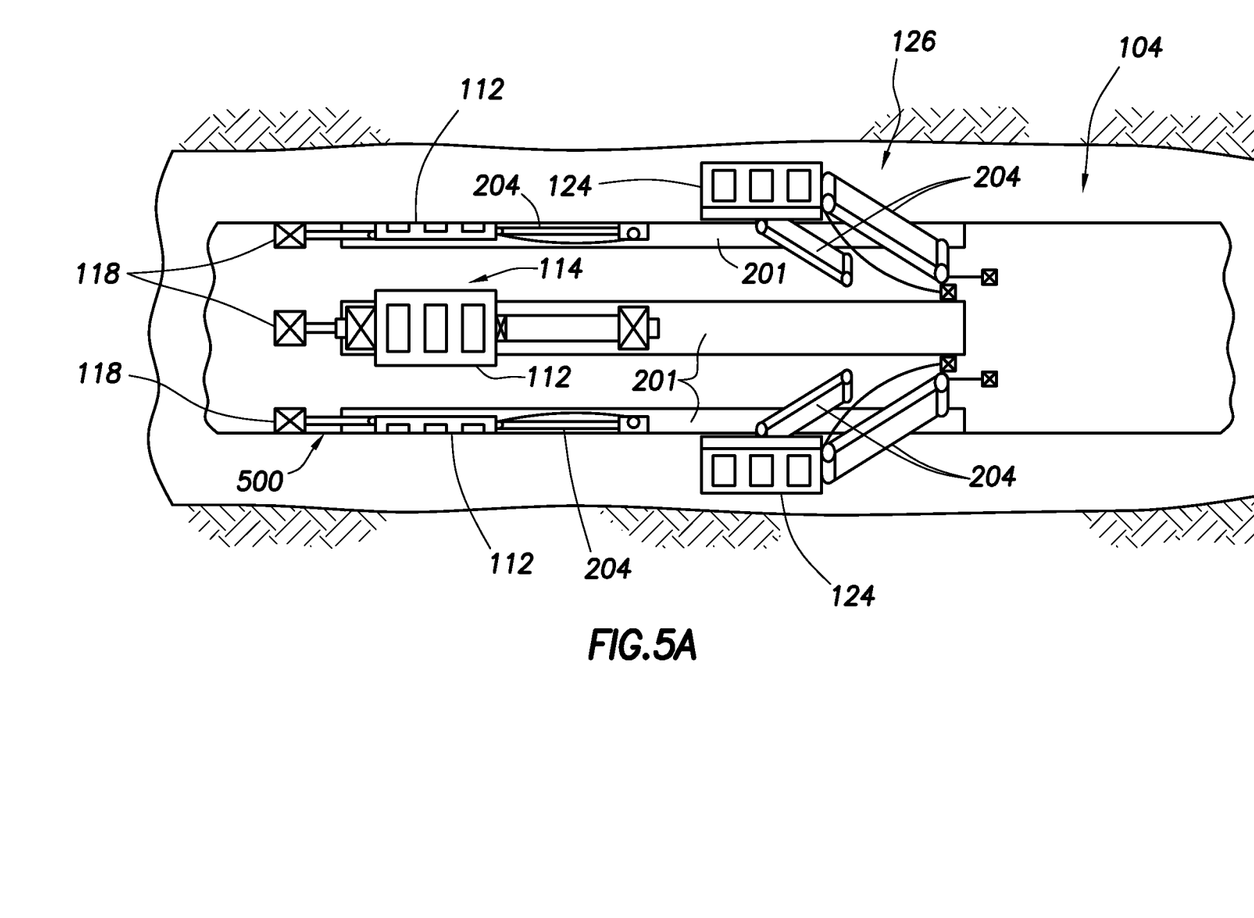
FIGS. 5A and 5B depict schematic views of another alternate configuration of the portion of the downhole tool of FIG. 3.
Figure 5B:
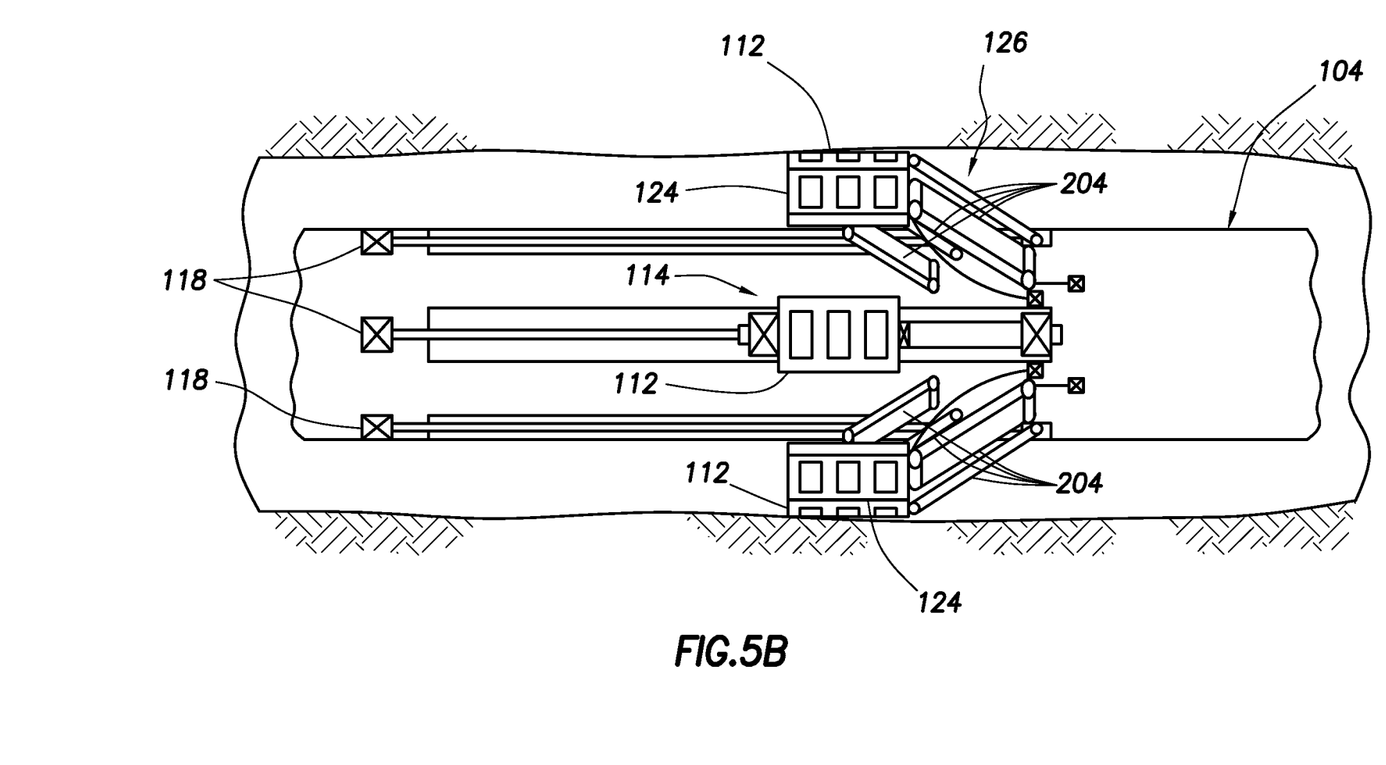

FIGS. 5A and 5B depict a schematic view of another alternate configuration of the downhole tool 104 having the translating arm set 114. In this configuration, the translating arm set 114 has the actuator 118 located downhole. The translating arm set 114 may have any of the features described herein. The translating arm set 114 may move from the retracted position to the logging position by moving up tool. If the extendable arms 204 are configured for unidirectional logging, the translating arm set 114 moving up tool may allow the translating sensor pads 112 to be engaged with the wellbore wall 122 while the translating arm set 114 is moving toward the logging position. The arm set 126 is shown as being stationary with the extendable arms 204. As shown in FIG. 5B, the arm set 126 may be actuated to the logging position prior to aligning the translating sensor pads 112 with the sensor pads 124. Although the actuator 118 is shown as being located down tool, it should be appreciated that the actuator 118 may be located up tool from the translating arm set 114. Therefore, with the arm set 126 in the logging position, the actuator 118 may pull the translating arm set 114 toward the logging position, or may translate and then extend the arm set 114 to the logging position. The actuator 118 may continue to move the translating arm set 114 until the logging position is reached.

As an alternative to the arm set 126, the downhole tool 104 may have a second translating arm set (not shown). The second translating arm set may have any of the parts of the arm set described herein, such as a second translating sensor pad, the actuator 118, the extendable arms 204, the guide 201 and the like (see for example FIGS. 2A-2D). The second translating arm set may be configured to align the second translating sensor pads in line with the translating sensor pads 112 when in the logging position.

Figure 6A:
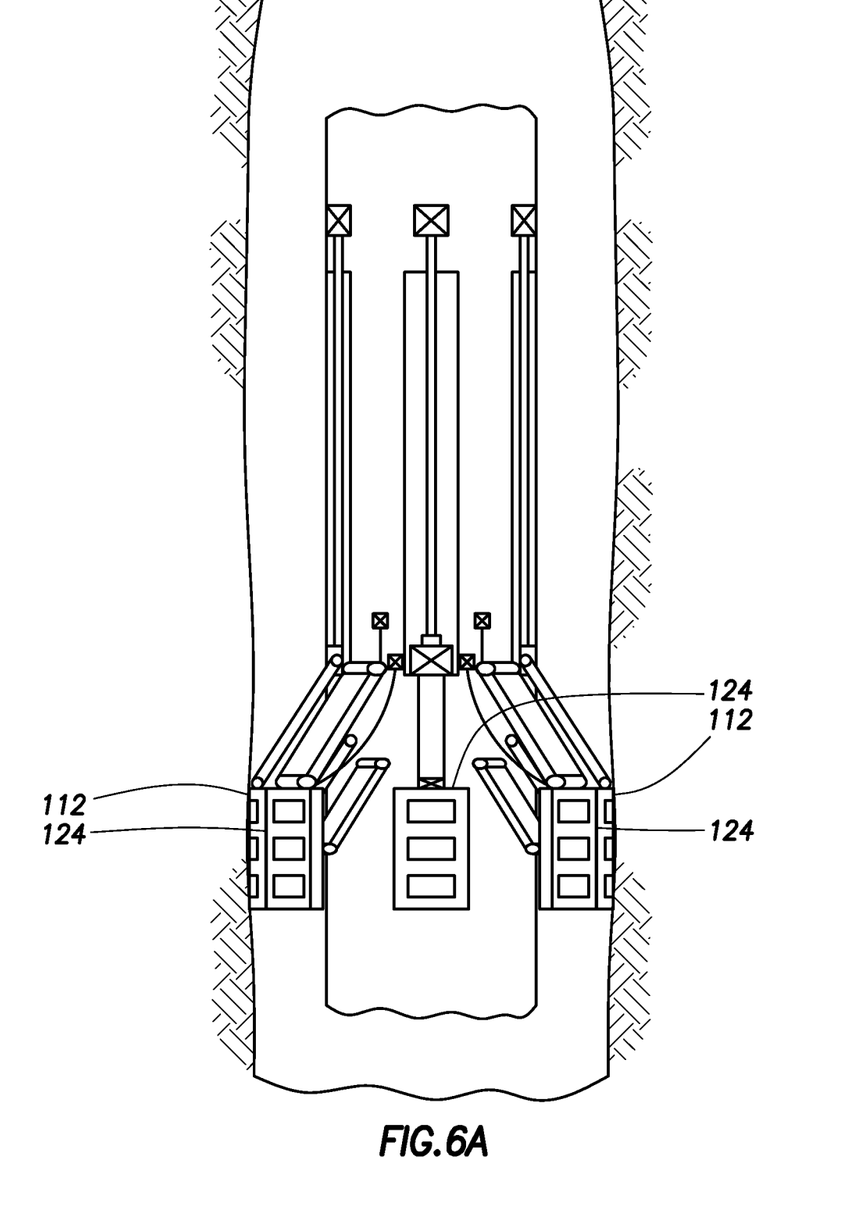
FIG. 6A depicts a side view of the portion of the downhole tool of FIG. 2C with a plurality of translating sensor pads and sensor pads in a logging position.

FIG. 6A depicts a side view of the downhole tool 104 of FIG. 2C showing the sensor pads 124, the translating sensor pads 112 and/or the second translating sensor pads in the logging position. In the logging position, the sensor pads 112 and/or 124 may log the wellbore wall in a similar manner as described herein, for example, with the sensor pads 112 and/or 124 in the coplanar position.

Figure 6B:
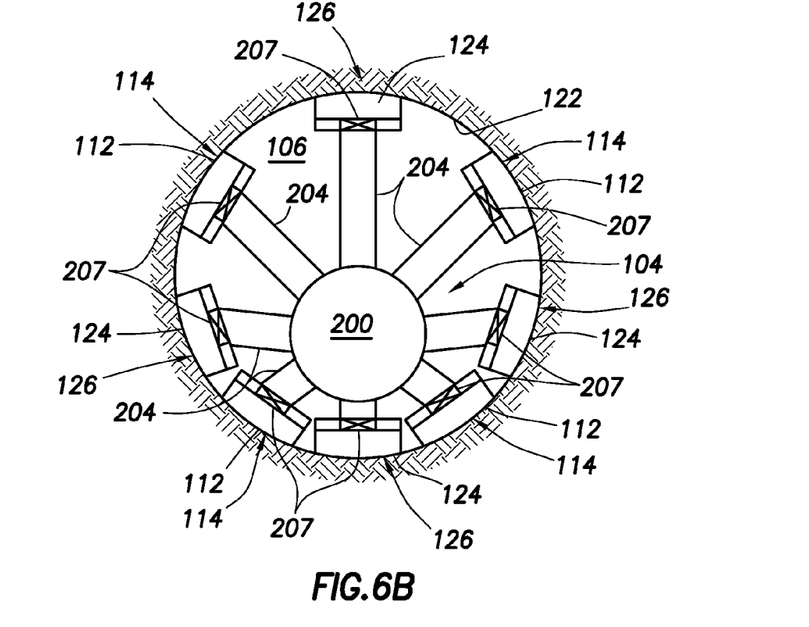
FIG. 6B depicts an end view of the plurality of translating sensor pads and sensor pads of FIG. 6A in a logging position.

FIG. 6B depicts an end view of the downhole tool of FIG. 6A in the logging position. The arm set 126, the translating arm set 114 and/or the second translating arm set may be configured to allow the sensor pads 112 and/or 124 to engage the wellbore wall 122. The arm sets 126 and/or 114 may be self adjusting in order to allow the sensor pads 112 and/or 124 to remain in contact with the wellbore wall 122 during the logging operation. For example, the sensor pads 112 and/or 124 may remain substantially in contact with the wellbore wall 122 when an upset in the wellbore wall is encountered and/or when the tool body 200 is eccentrically located within the wellbore 106, as shown. Each of the extendable arms 204 within the translating arm set 114 and/or arm set 126 may be independently actuated or actuated together. Although FIG. 6B depicts the arms 204 within the arm sets 114 and/or 126 as moving independently of one another, the arms 204 in each of the translating arm sets 114 and/or the arm set 126 may be cross-linked to one another. For example, the cross-linked arms 204 may be configured to all actuate together and move toward the wellbore wall 122. The cross-linked arms may further be configured to extend together at the same radial distance from the downhole tool 104. The arm sets 114 may be any suitable arms, or arm sets, for example those used with NCMI™, SHDT™, FMS™, FMI™, OBMI™, OBDT™ and HDT™ tools.

Figure 7:
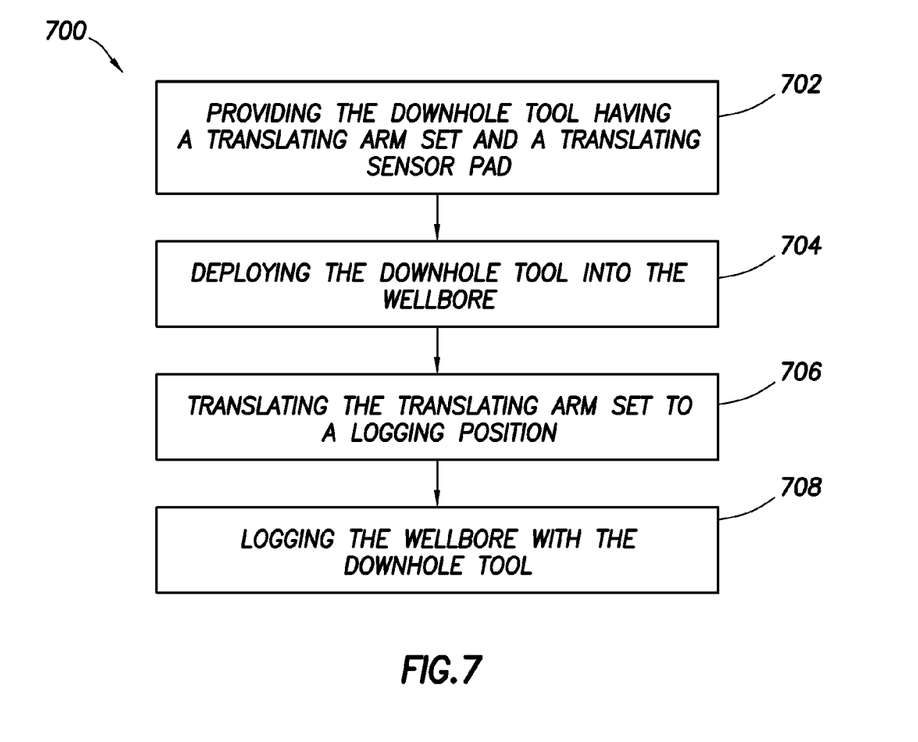
FIG. 7 depicts a method for logging the wellbore.

FIG. 7 depicts a flowchart 700 depicting a method of logging a wellbore. The flowchart begins by providing 702 the downhole tool having a translating arm set and a translating sensor pad. The flow chart continues by deploying 704 the downhole tool into the wellbore. The downhole tool may be any downhole tool described herein. The flowchart continues by translating 706 the translating arm set to a logging position. The logging position may be a selected longitudinal position on the downhole tool. The selected longitudinal position may be a position wherein the sensor pads and the translating sensor pads are coplanar. The flowchart continues by logging 708 the wellbore with the downhole tool 104. Logging the wellbore may comprise measuring at least one downhole parameter with the sensor pads and the translating sensor pads.

It should be understood that the components of the inventions set forth above can be provided as unitary elements, or multiple elements which are connected and/or otherwise adapted to function together, unless specifically limited to a unitary structure in the claims.

While the embodiments are described with reference to various implementations and exploitations, it will be understood that these embodiments are illustrative and that the scope of the inventive subject matter is not limited to them. Many variations, modifications, additions and improvements are possible. For example, the techniques used herein may be applied to log multiple wellbores.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A system for logging a wellbore having a wellbore wall and at least one subterranean formation thereabout, system comprising:
   a downhole tool deployable into the wellbore;
   a plurality of arm sets, wherein each of the arm sets is configured to translate along a longitudinal axis of the downhole tool, each of the plurality of arm sets comprising:
   at least one sensor pad for measuring at least one downhole parameter;
   at least one extendable arm extendable from the downhole tool for locating each of the at least one sensor pads proximate the wellbore wall; and
   an actuator configured to translate at least a portion of at least one of the plurality of arm sets along the longitudinal axis of the downhole tool whereby the sensor pads of each of the plurality of arm sets is positionable at a selected longitudinal position relative to the downhole tool.

2. The system of claim 1, further comprising a conveyance for deploying the downhole tool into the wellbore.

3. The system of claim 2, wherein the conveyance is a wireline.

4. The system of claim 1, further comprising a surface unit for controlling the downhole tool.

* * * * *